US012124418B2

(12) United States Patent
Zhang et al.

(10) Patent No.: US 12,124,418 B2
(45) Date of Patent: Oct. 22, 2024

(54) SYSTEMS AND METHODS FOR APPLICATION ACCESS

(71) Applicant: Citrix Systems, Inc., Fort Lauderdale, FL (US)

(72) Inventors: Wenshuang Zhang, Nanjing (CN); Gaojun Chen, Nanjing (CN)

( * ) Notice: Subject to any disclaimer, the term of this patent is extended or adjusted under 35 U.S.C. 154(b) by 607 days.

(21) Appl. No.: 17/132,741

(22) Filed: Dec. 23, 2020

(65) Prior Publication Data
US 2022/0083517 A1 Mar. 17, 2022

Related U.S. Application Data

(63) Continuation of application No. PCT/CN2020/114785, filed on Sep. 11, 2020.

(51) Int. Cl.
*G06F 16/00* (2019.01)
*G06F 9/455* (2018.01)
*G06F 16/21* (2019.01)
*G06F 9/22* (2006.01)

(52) U.S. Cl.
CPC ........ *G06F 16/212* (2019.01); *G06F 9/45558* (2013.01); *G06F 9/22* (2013.01); *G06F 2009/45562* (2013.01)

(58) Field of Classification Search
CPC .................................................. G06F 16/212
See application file for complete search history.

(56) References Cited

U.S. PATENT DOCUMENTS

| 8,468,164 | B1* | 6/2013 | Paleja | H04L 67/1097 |
| | | | | 708/805 |
| 2012/0179973 | A1* | 7/2012 | Brolley | G06Q 30/0282 |
| | | | | 715/738 |
| 2013/0173637 | A1* | 7/2013 | Kim | G06F 16/27 |
| | | | | 707/736 |
| 2013/0185292 | A1* | 7/2013 | Li | G06F 16/22 |
| | | | | 707/723 |
| 2014/0317031 | A1* | 10/2014 | Babenko | G06Q 30/0631 |
| | | | | 706/46 |
| 2015/0095322 | A1* | 4/2015 | Procopio | G06Q 30/0631 |
| | | | | 707/723 |
| 2016/0299977 | A1* | 10/2016 | Hreha | G06F 16/9537 |
| 2017/0171336 | A1 | 6/2017 | Yin | |
| 2017/0351388 | A1* | 12/2017 | Grunewald | H04W 4/60 |
| 2020/0065343 | A1* | 2/2020 | Morkovine | H04L 65/4015 |

FOREIGN PATENT DOCUMENTS

CN 103617075 A 3/2014

OTHER PUBLICATIONS

"How to Build a Recommendation Engine in Two Minutes Flat", neo4j, downloaded from https://neo4J.com/developer/guide-build-a-recommendation-engine/ on Jul. 10, 2020.

* cited by examiner

*Primary Examiner* — Khanh B Pham

(57) ABSTRACT

Methods and systems for generating recommendations for microapps are described herein. A plurality of microapps may be provided to a user to subscribe to (e.g., use). The user may have difficulty determining, from among the plurality of microapps, which microapps the user may want to use. To improve user experience, microapp recommendations may be sent to the user to assist the user in determining which microapps to use. The microapp recommendations may be based on correlation levels determined between pairs of microapps.

21 Claims, 14 Drawing Sheets

SYSTEMS AND METHODS FOR APPLICATION ACCESS

CROSS REFERENCE TO RELATED APPLICATIONS

This application claims priority to International Application No. PCT/CN2020/114785, filed Sep. 11, 2020, and entitled "Systems and Methods for Application Access," which is hereby incorporated by reference in its entirety.

FIELD

Aspects described herein generally relate to computer networking, remote computer access, virtualization, artificial intelligence, and hardware and software related thereto. More specifically, one or more aspects described herein provide access to one or more software applications relevant to a user.

BACKGROUND

Software applications may be used to assist in work related or other activities. A software application may offer a large number of functions that enable a user to perform many tasks. The large number of functions may cause the software application to run slowly and/or less efficiently, which may cause a poor user experience if a user wants to simply access a particular function of the software application to perform a task quickly. Micro applications (microapps) may allow a user to perform the particular function without requiring the user to open a full software application and may improve a user's ability to perform the particular function more quickly.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Microapps (e.g., software applications) may be offered to users to assist the user in a variety of activities. Microapps may allow users to increase productivity and better perform work-related tasks. In some cases, a large number of microapps may be available for use by the user. Users may be unaware of relevant applications that may be helpful. Due to the lack of awareness, a user may be unable to access an application the user needs to perform a task or other assigned action. Due to the large number of microapps, it may be difficult for a user to learn about each microapp and determine whether each microapp will be helpful to the user or not. The user may have a poor experience because the user may be unable to determine which microapps the user should use.

To overcome limitations described above, and to overcome other limitations that will be apparent upon reading and understanding the present specification, aspects described herein are directed towards generating recommendations for microapps. A plurality of microapps may be provided to a user to subscribe to (e.g., use). The user may have difficulty determining, from among the plurality of microapps, which microapps the user may want to use. To improve user experience, microapp recommendations may be sent to the user to assist the user in determining which microapps to use. The microapp recommendations may be based on correlation levels determined between pairs of microapps. The correlation level may be based on the quantity of users that use both microapps in a pair of microapps. More recent usage of microapps may be weighted more heavily to influence whether a microapp is recommended or not.

In one aspect, a computer implemented method may include receiving, by a computing device, a request from a client device to use a first microapp; determining, by the computing device, a correlation between the first microapp and a second microapp based on a first number of users that use both the first microapp and a second microapp during a given time period; and providing access to the second microapp in response to the correlation exceeding a threshold.

The method may further include weighting, based on a determination that the time period is more recent than a second time period corresponding to a second number of users, the first number more than the second number. The determining a correlation between the first microapp and the second microapp may include determining a number of users of the first microapp during the time period; and determining, based on the number of users of the first microapp and the number of users that use both the first microapp and the second microapp, the correlation. The number of users may be determined based on edge information indicating a time at which each user began using the first microapp. The first number of users may be determined based on information retrieved from a graph database, wherein the graph database comprises a user node corresponding to each user. The first microapp and second microapp may be determined based on information retrieved from a graph database, wherein the graph database stores a first microapp node corresponding to the first microapp. The first number of users may be determined based on information retrieved from a graph database, wherein the graph database comprises a user node indicating a user and an edge connecting the user node to a microapp node, wherein the edge indicates that the user has subscribed to a microapp corresponding to the microapp node. The number of users of both the first microapp and the second microapp may correspond to users that are within a same working group as a user associated with the user device. The number of users of both the first microapp and the second microapp may correspond to users selected by a user associated with the user device. The number of users of both the first microapp and the second microapp may correspond to users with a same job title as a user associated with the user device. The method may further include determining, for a user associated with the user device, a number of team members that have used the second microapp; and adjusting, based on the number of team members, an order of the second microapp within the list of recommendations.

In one aspect, a computer implemented method may include receiving, based on a request from a user device, an indication that the user device has used a first microapp; storing, in a graph database, an edge connecting a user node corresponding to the user device and a microapp node corresponding to the first microapp; determining, based on a first correlation set and a second correlation set corresponding to the graph database, a correlation between the first microapp and a second microapp; and based on the correlation exceeding a threshold, sending, to the user device, a recommendation to use the second microapp.

The method may further include weighting, based on a determination that a time period corresponding to a first number in the first correlation set is more recent than a time period corresponding to a second number in the first correlation set, the first number more than the second number. The first correlation set may indicate a number of users of the first microapp, the method further comprising determining, based on user preferences indicating a limit to the number of users of the first microapp, a reduced number of users of the first microapp. A number of users of both the first microapp and the second microapp may correspond to users that are within a same working group as a user associated with the user device. A number of users of both the first microapp and the second microapp may correspond to users selected by a user associated with the user device. A number of users of both the first microapp and the second microapp may correspond to users with a same job title as a user associated with the user device.

The method may further include determining, for a user associated with the user device, a number of team members that have used the second microapp; and adjusting, based on the number of team members, an order of the second microapp within a list of recommendations comprising the second microapp.

In some aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," "positioned," and similar terms, is meant to include both direct and indirect, connecting, coupling, and positioning.

Computing Architecture

Figure 1:
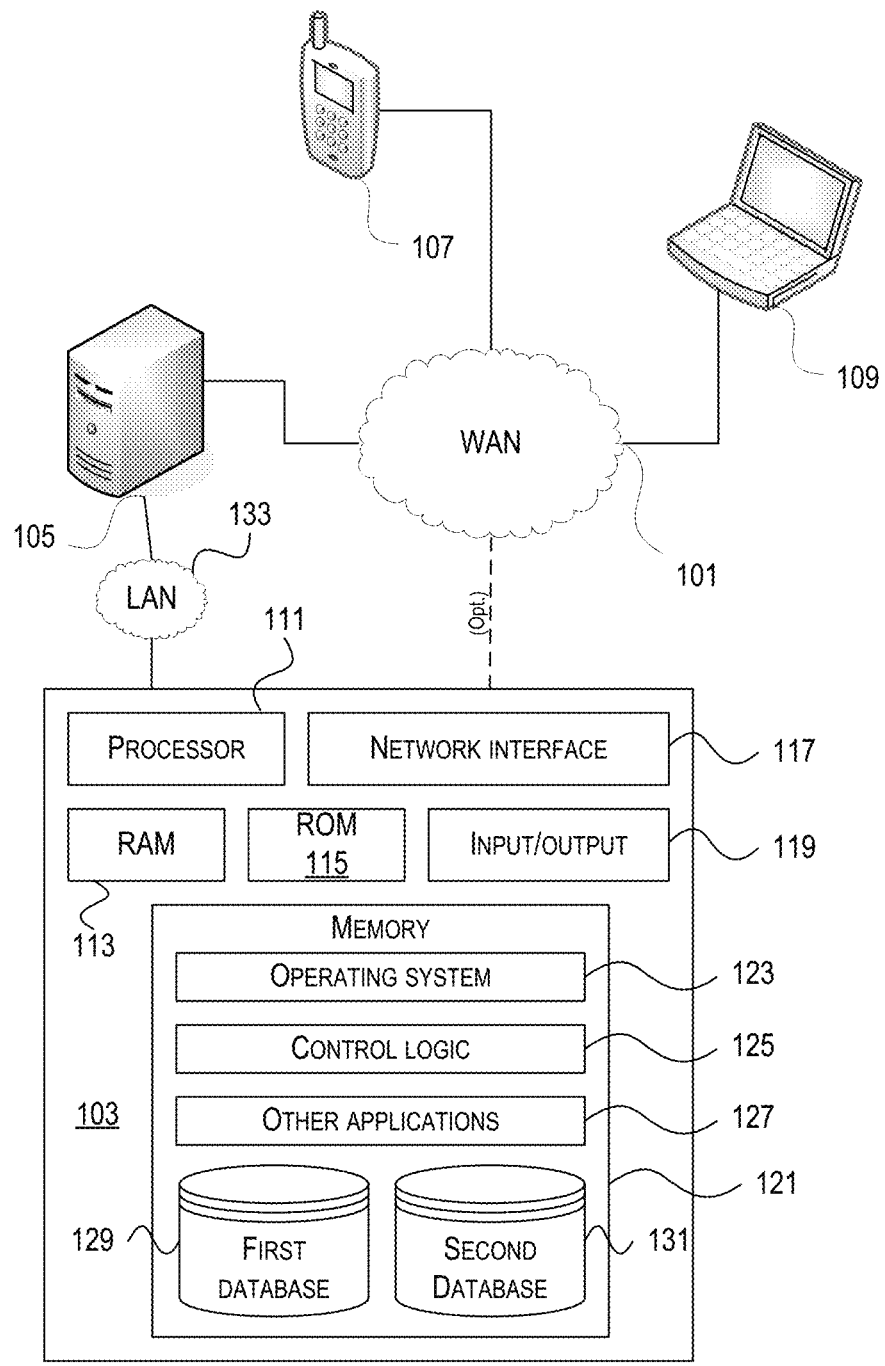
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
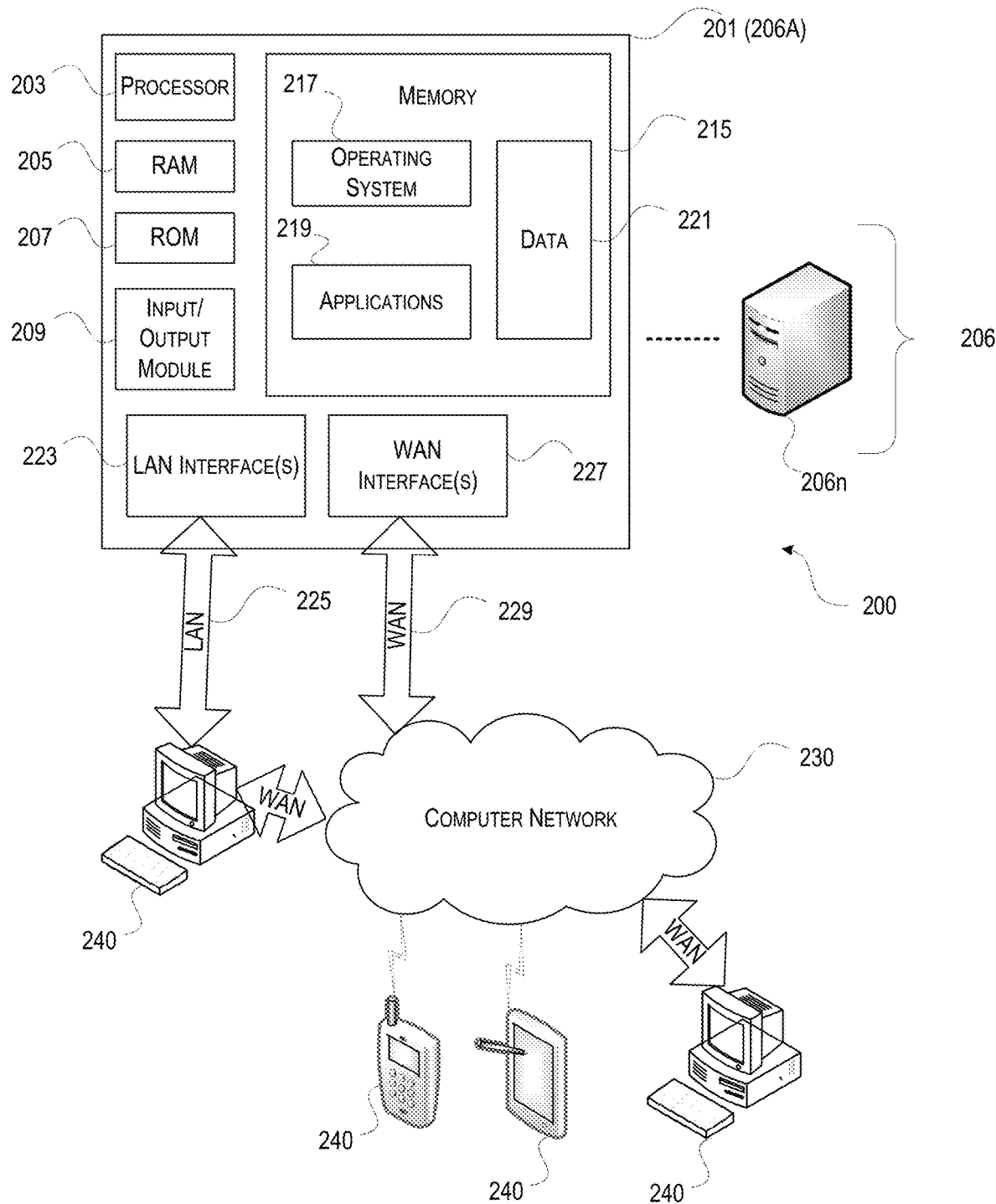
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 103 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
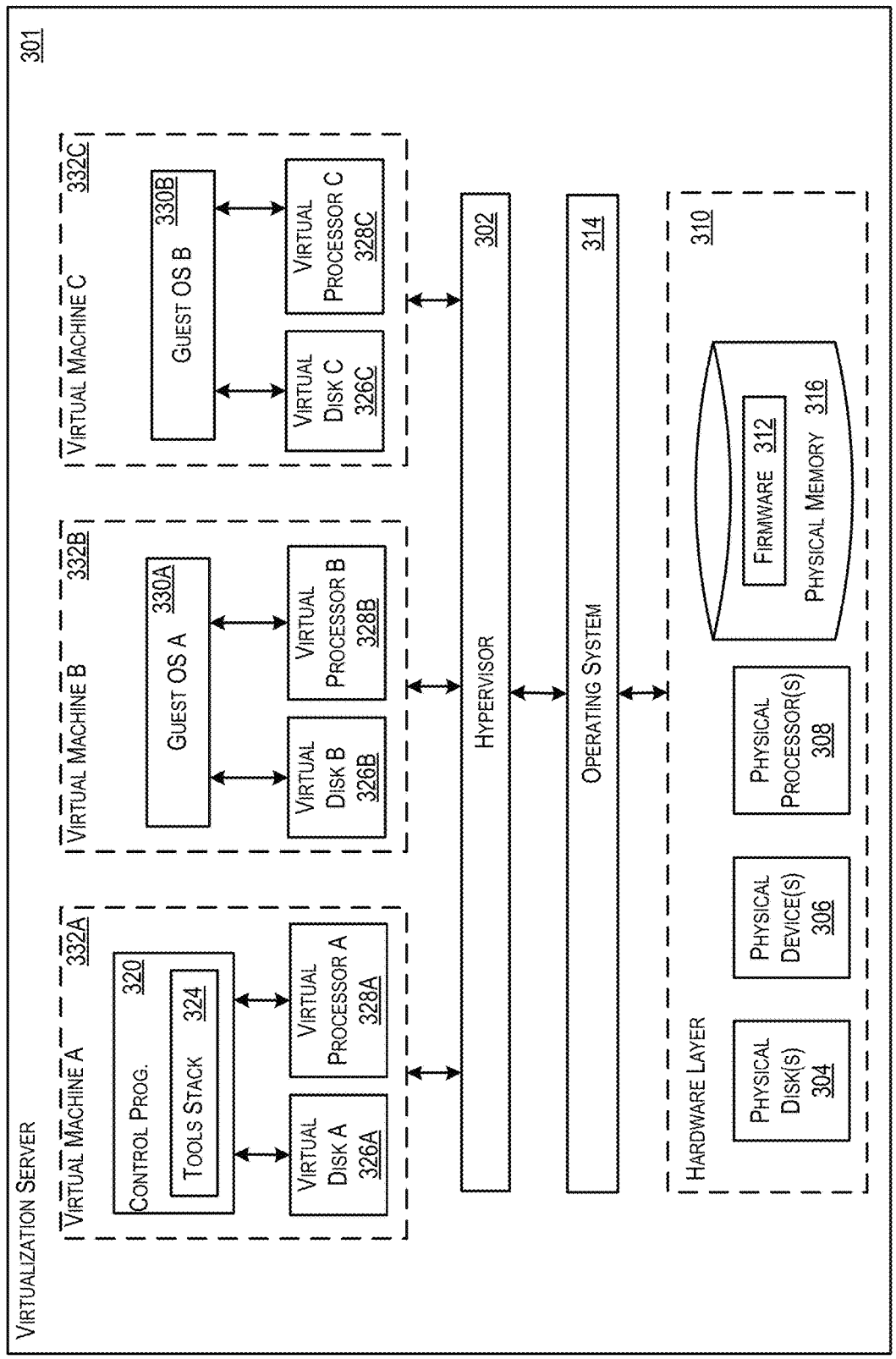
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C(generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C(generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
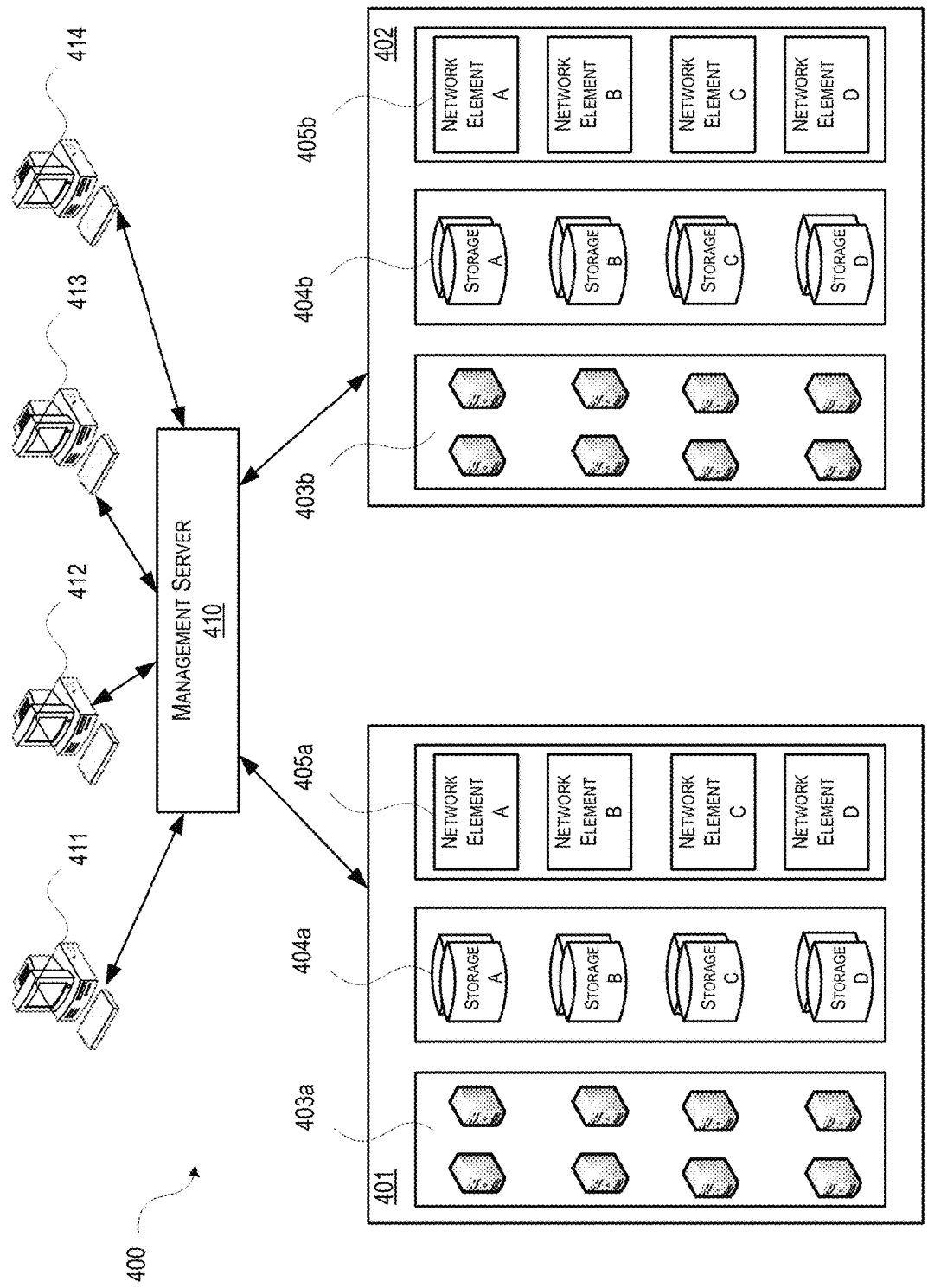
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5A:
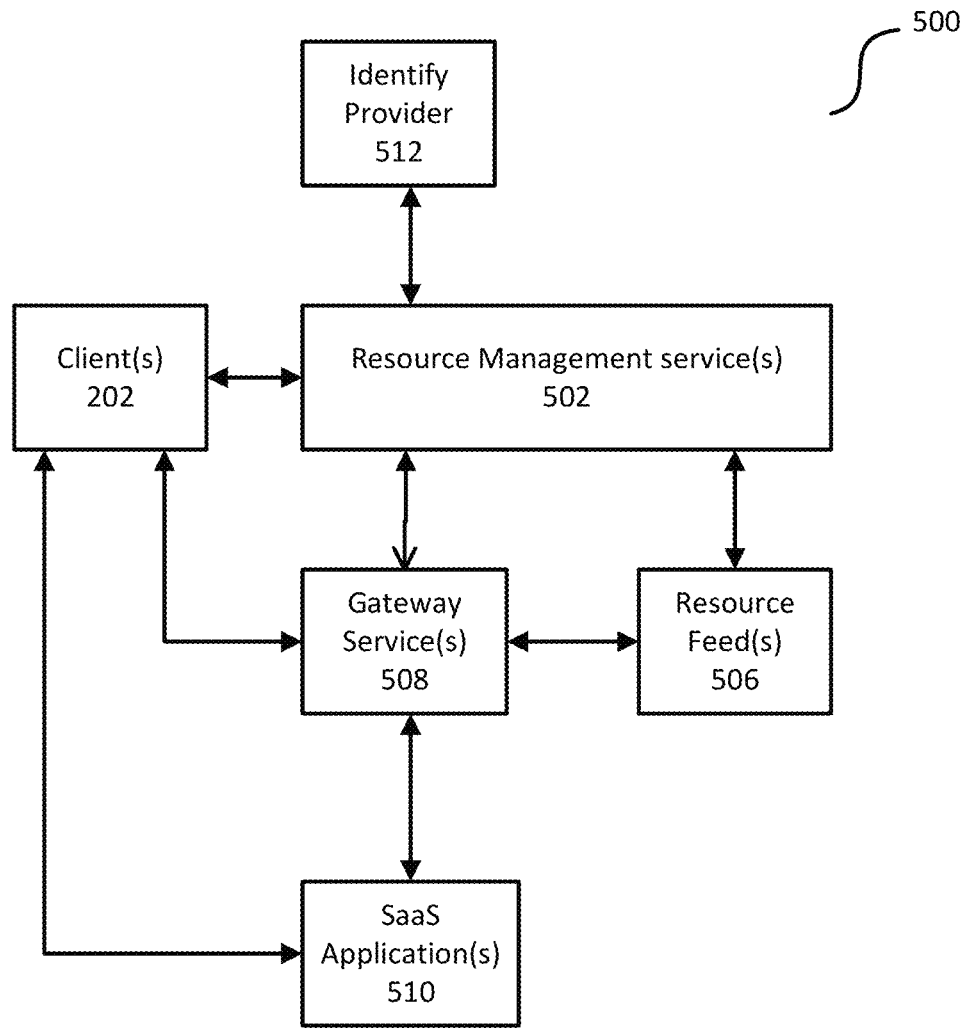
FIG. 5A is a block diagram of an example system in which resource management services may manage and streamline access by clients to resource feeds (via one or more gateway services) and/or software-as-a-service (SaaS) applications.

FIG. 5A is a block diagram of an example system 500 in which one or more resource management services 502 may manage and streamline access by one or more clients 202 to one or more resource feeds 506 (via one or more gateway services 508) and/or one or more software-as-a-service (SaaS) applications 510. In particular, the resource management service(s) 502 may employ an identity provider 512 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 506, the client 202 may use the supplied credentials to access the selected resource via a gateway service 508. For the SaaS application(s) 510, the client 202 may use the credentials to access the selected application directly.

The client(s) 202 may be any type of computing devices capable of accessing the resource feed(s) 506 and/or the SaaS application(s) 510, and may, for example, include a variety of desktop or laptop computers, smartphones, tablets, etc. The resource feed(s) 506 may include any of numerous resource types and may be provided from any of numerous locations. In some embodiments, for example, the resource feed(s) 506 may include one or more systems or services for providing virtual applications and/or desktops to the client(s) 202, one or more file repositories and/or file sharing systems, one or more secure browser services, one or more access control services for the SaaS applications 510, one or more management services for local applications on the client(s) 202, one or more internet enabled devices or sensors, etc. Each of the resource management service(s)

502, the resource feed(s) 506, the gateway service(s) 508, the SaaS application(s) 510, and the identity provider 512 may be located within an on-premises data center of an organization for which the system 500 is deployed, within one or more cloud computing environments, or elsewhere.

Figure 5B:
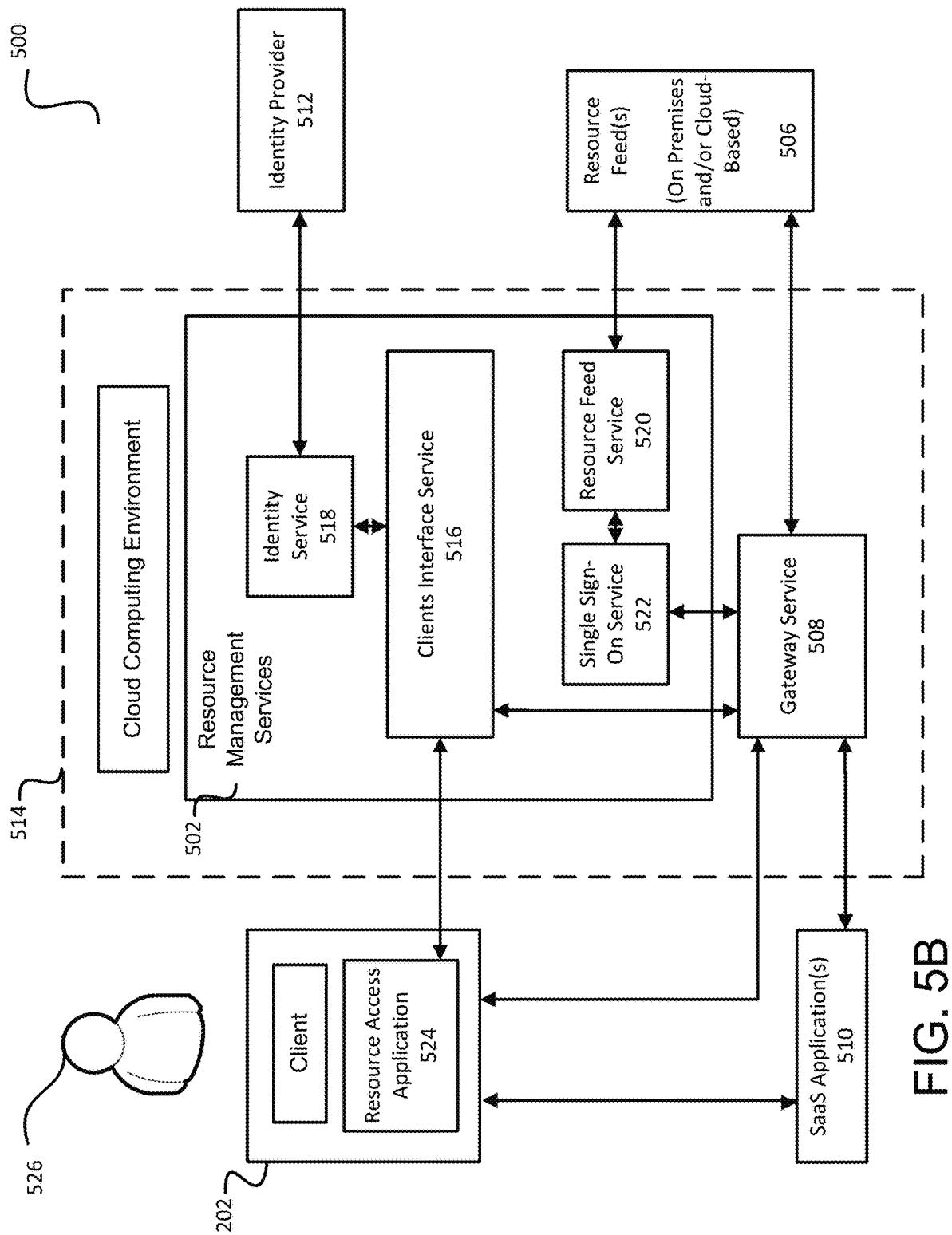
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 508 are located within a cloud computing environment 514. The cloud computing environment may, for example, include Microsoft Azure Cloud, Amazon Web Services, Google Cloud, or IBM Cloud.

For any of illustrated components (other than the client 202) that are not based within the cloud computing environment 514, cloud connectors (not shown in FIG. 5B) may be used to interface those components with the cloud computing environment 514. Such cloud connectors may, for example, run on Windows Server instances hosted in resource locations and may create a reverse proxy to route traffic between the site(s) and the cloud computing environment 514. In the illustrated example, the cloud-based resource management services 502 include a client interface service 516, an identity service 518, a resource feed service 520, and a single sign-on service 522. As shown, in some embodiments, the client 202 may use a resource access application 524 to communicate with the client interface service 516 as well as to present a user interface on the client 202 that a user 526 can operate to access the resource feed(s) 506 and/or the SaaS application(s) 510. The resource access application 524 may either be installed on the client 202, or may be executed by the client interface service 516 (or elsewhere in the system 500) and accessed using a web browser (not shown in FIG. 5B) on the client 202.

As explained in more detail below, in some embodiments, the resource access application 524 and associated components may provide the user 526 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 524 is launched or otherwise accessed by the user 526, the client interface service 516 may send a sign-on request to the identity service 518. In some embodiments, the identity provider 512 may be located on the premises of the organization for which the system 500 is deployed. The identity provider 512 may, for example, correspond to an on-premises Windows Active Directory. In such embodiments, the identity provider 512 may be connected to the cloud-based identity service 518 using a cloud connector (not shown in FIG. 5B), as described above. Upon receiving a sign-on request, the identity service 518 may cause the resource access application 524 (via the client interface service 516) to prompt the user 526 for the user's authentication credentials (e.g., user-name and password). Upon receiving the user's authentication credentials, the client interface service 516 may pass the credentials along to the identity service 518, and the identity service 518 may, in turn, forward them to the identity provider 512 for authentication, for example, by comparing them against an Active Directory domain. Once the identity service 518 receives confirmation from the identity provider 512 that the user's identity has been properly authenticated, the client interface service 516 may send a request to the resource feed service 520 for a list of subscribed resources for the user 526.

In other embodiments (not illustrated in FIG. 5B), the identity provider 512 may be a cloud-based identity service, such as a Microsoft Azure Active Directory. In such embodiments, upon receiving a sign-on request from the client interface service 516, the identity service 518 may, via the client interface service 516, cause the client 202 to be redirected to the cloud-based identity service to complete an authentication process. The cloud-based identity service may then cause the client 202 to prompt the user 526 to enter the user's authentication credentials. Upon determining the user's identity has been properly authenticated, the cloud-based identity service may send a message to the resource access application 524 indicating the authentication attempt was successful, and the resource access application 524 may then inform the client interface service 516 of the successfully authentication. Once the identity service 518 receives confirmation from the client interface service 516 that the user's identity has been properly authenticated, the client interface service 516 may send a request to the resource feed service 520 for a list of subscribed resources for the user 526.

For each configured resource feed, the resource feed service 520 may request an identity token from the single sign-on service 522. The resource feed service 520 may then pass the feed-specific identity tokens it receives to the points of authentication for the respective resource feeds 506. Each resource feed 506 may then respond with a list of resources configured for the respective identity. The resource feed service 520 may then aggregate all items from the different feeds and forward them to the client interface service 516, which may cause the resource access application 524 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 510 to which the user 526 has subscribed. The lists of local applications and the SaaS applications 510 may, for example, be supplied by resource feeds 506 for respective services that manage which such applications are to be made available to the user 526 via the resource access application 524. Examples of SaaS applications 510 that may be managed and accessed as described herein include Microsoft Office 365 applications, SAP SaaS applications, Workday applications, etc.

For resources other than local applications and the SaaS application(s) 510, upon the user 526 selecting one of the listed available resources, the resource access application 524 may cause the client interface service 516 to forward a request for the specified resource to the resource feed service 520. In response to receiving such a request, the resource feed service 520 may request an identity token for the corresponding feed from the single sign-on service 522. The resource feed service 520 may then pass the identity token received from the single sign-on service 522 to the client interface service 516 where a launch ticket for the resource may be generated and sent to the resource access application 524. Upon receiving the launch ticket, the resource access application 524 may initiate a secure session to the gateway service 508 and present the launch ticket. When the gateway service 508 is presented with the launch ticket, it may initiate a secure session to the appropriate resource feed and present the identity token to that feed to seamlessly authenticate the user 526. Once the session initializes, the client 202 may proceed to access the selected resource.

When the user 526 selects a local application, the resource access application 524 may cause the selected local application to launch on the client 202. When the user 526 selects a SaaS application 510, the resource access application 524 may cause the client interface service 516 request a one-time uniform resource locator (URL) from the gateway service 508 as well a preferred browser for use in accessing the SaaS application 510. After the gateway service 508 returns the one-time URL and identifies the preferred browser, the client interface service 516 may pass that information along to the resource access application 524. The client 202 may then launch the identified browser and initiate a connection to the gateway service 508. The gateway service 508 may then request an assertion from the single sign-on service 522. Upon receiving the assertion, the gateway service 508 may cause the identified browser on the client 202 to be redirected to the logon page for identified SaaS application 510 and present the assertion. The SaaS may then contact the gateway service 508 to validate the assertion and authenticate the user 526. Once the user has been authenticated, communication may occur directly between the identified browser and the selected SaaS application 510, thus allowing the user 526 to use the client 202 to access the selected SaaS application 510.

In some embodiments, the preferred browser identified by the gateway service 508 may be a specialized browser embedded in the resource access application 524 (when the resource application is installed on the client 202) or provided by one of the resource feeds 506 (when the resource application 524 is located remotely), e.g., via a secure browser service. In such embodiments, the SaaS applications 510 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 506) for assessment of its security risk by a web filtering service. For approved URLs, the specialized browser may be permitted to access the link. For suspicious links, however, the web filtering service may have the client interface service 516 send the link to a secure browser service, which may start a new virtual browser session with the client 202, and thus allow the user to access the potentially harmful linked content in a safe environment.

In some embodiments, in addition to or in lieu of providing the user 526 with a list of resources that are available to be accessed individually, as described above, the user 526 may instead be permitted to choose to access a streamlined feed of event notifications and/or available actions that may be taken with respect to events that are automatically detected with respect to one or more of the resources. This streamlined resource activity feed, which may be customized for each user 526, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 526 of something that requires the user's attention (e.g., approval of an expense report, new course available for registration, etc.). A microapp may include an application, a widget, or any other software that is configured to execute on a computing device. In some embodiments, a microapp may be accessible on a device without requiring installation of the microapp. A microapp may provide easy access to functionality or data of a corresponding application without launching the corresponding application.

Figure 5C:
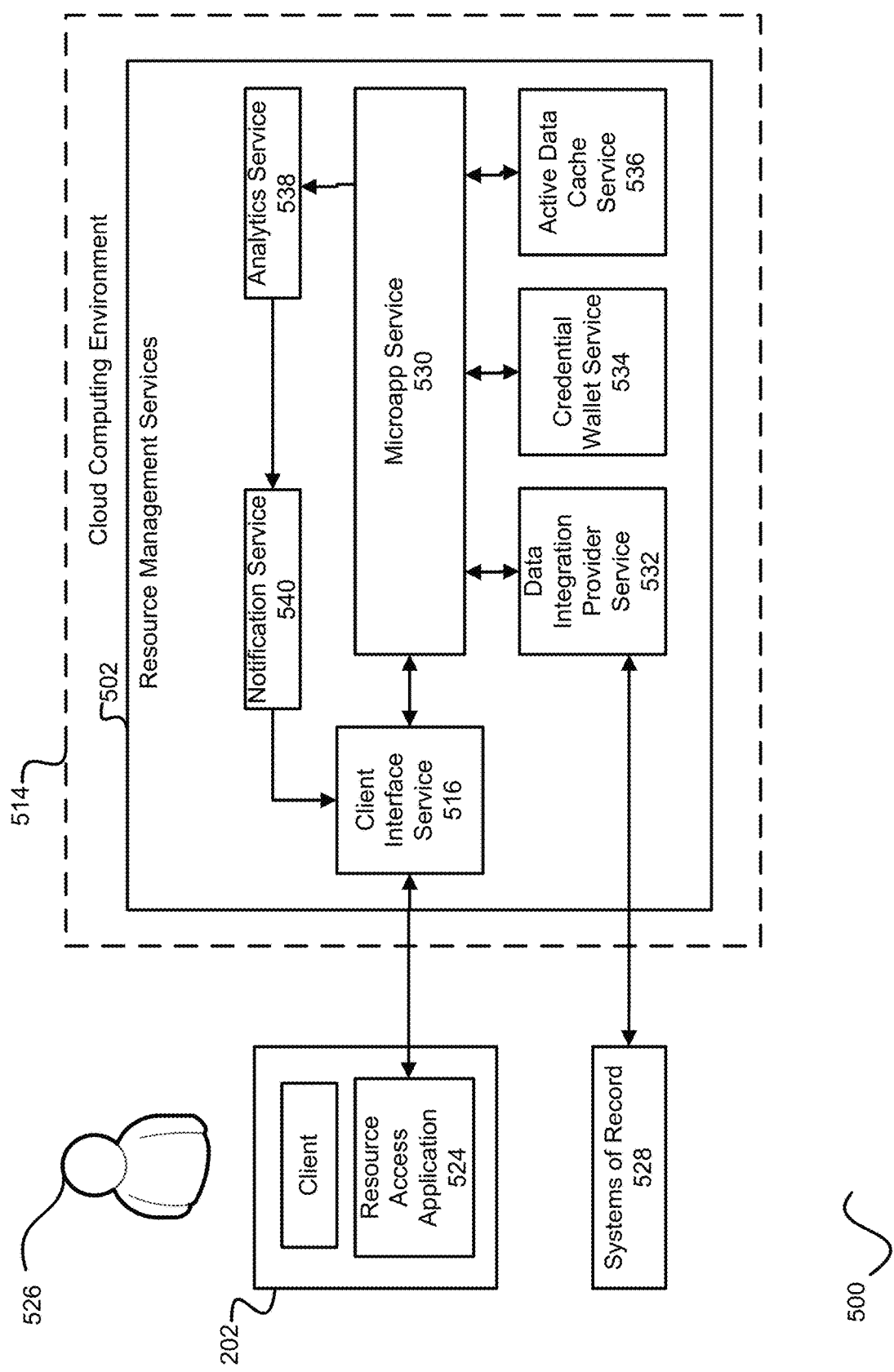
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 528 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 516 discussed above, the illustrated services include a microapp service 530, a data integration provider service 532, a credential wallet service 534, an active data cache service 536, an analytics service 538, and a notification service 540. In various embodiments, the services shown in FIG. 5C may be employed either in addition to or instead of the different services shown in FIG. 5B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 524 without having to launch the native application. The system shown in FIG. 5C may, for example, aggregate relevant notifications, tasks, and insights, and thereby give the user 526 a dynamic productivity tool. In some embodiments, the resource activity feed may be intelligently populated by utilizing machine learning and artificial intelligence (AI) algorithms. Further, in some implementations, microapps may be configured within the cloud computing environment 514, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 528 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 532, may, for example, support REST API, JSON, OData-JSON, and 6ML. As explained in more detail below, the data integration provider service 532 may also write back to the systems of record, for example, using OAuth2 or a service account.

In some embodiments, the microapp service 530 may be a single-tenant service responsible for creating the microapps. The microapp service 530 may send raw events, pulled from the systems of record 528, to the analytics service 538 for processing. The microapp service may, for example, periodically pull active data from the systems of record 528.

In some embodiments, the active data cache service 536 may be single-tenant and may store all configuration information and microapp data. It may, for example, utilize a per-tenant database encryption key and per-tenant database credentials.

In some embodiments, the credential wallet service 534 may store encrypted service credentials for the systems of record 528 and user OAuth2 tokens.

In some embodiments, the data integration provider service 532 may interact with the systems of record 528 to decrypt end-user credentials and write back actions to the systems of record 528 under the identity of the end-user. The write-back actions may, for example, utilize a user's actual account to ensure all actions performed are compliant with data policies of the application or other resource being interacted with.

In some embodiments, the analytics service 538 may process the raw events received from the microapps service 530 to create targeted scored notifications and send such notifications to the notification service 540.

Finally, in some embodiments, the notification service 540 may process any notifications it receives from the analytics service 538. In some implementations, the notification service 540 may store the notifications in a database to be later served in a notification feed. In other embodiments, the notification service 540 may additionally or alternatively send the notifications out immediately to the client 202 as a push notification to the user 526.

In some embodiments, a process for synchronizing with the systems of record 528 and generating notifications may operate as follows. The microapp service 530 may retrieve encrypted service account credentials for the systems of record 528 from the credential wallet service 534 and request a sync with the data integration provider service 532. The data integration provider service 532 may then decrypt the service account credentials and use those credentials to retrieve data from the systems of record 528. The data integration provider service 532 may then stream the retrieved data to the microapp service 530. The microapp service 530 may store the received systems of record data in the active data cache service 536 and also send raw events to the analytics service 538. The analytics service 538 may create targeted scored notifications and send such notifications to the notification service 540. The notification service 540 may store the notifications in a database to be later served in a notification feed and/or may send the notifications out immediately to the client 202 as a push notification to the user 526.

In some embodiments, a process for processing a user-initiated action via a microapp may operate as follows. The client 202 may receive data from the microapp service 530 (via the client interface service 516) to render information corresponding to the microapp. The microapp service 530 may receive data from the active data cache service 536 to support that rendering. The user 526 may invoke an action from the microapp, causing the resource access application 524 to send that action to the microapp service 530 (via the client interface service 516). The microapp service 530 may then retrieve from the credential wallet service 534 an encrypted Oauth2 token for the system of record for which the action is to be invoked, and may send the action to the data integration provider service 532 together with the encrypted Oath2 token. The data integration provider service 532 may then decrypt the Oath2 token and write the action to the appropriate system of record under the identity of the user 526. The data integration provider service 532 may then read back changed data from the written-to system of record and send that changed data to the microapp service 530. The microapp service 532 may then update the active data cache service 536 with the updated data and cause a message to be sent to the resource access application 524 (via the client interface service 516) notifying the user 526 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistance through either the resource access application 524 or directly from another resource, such as Microsoft Teams. This feature may allow employees to work efficiently, stay organized, and deliver only the specific information they're looking for.

Microapp Recommendation

Figure 6:
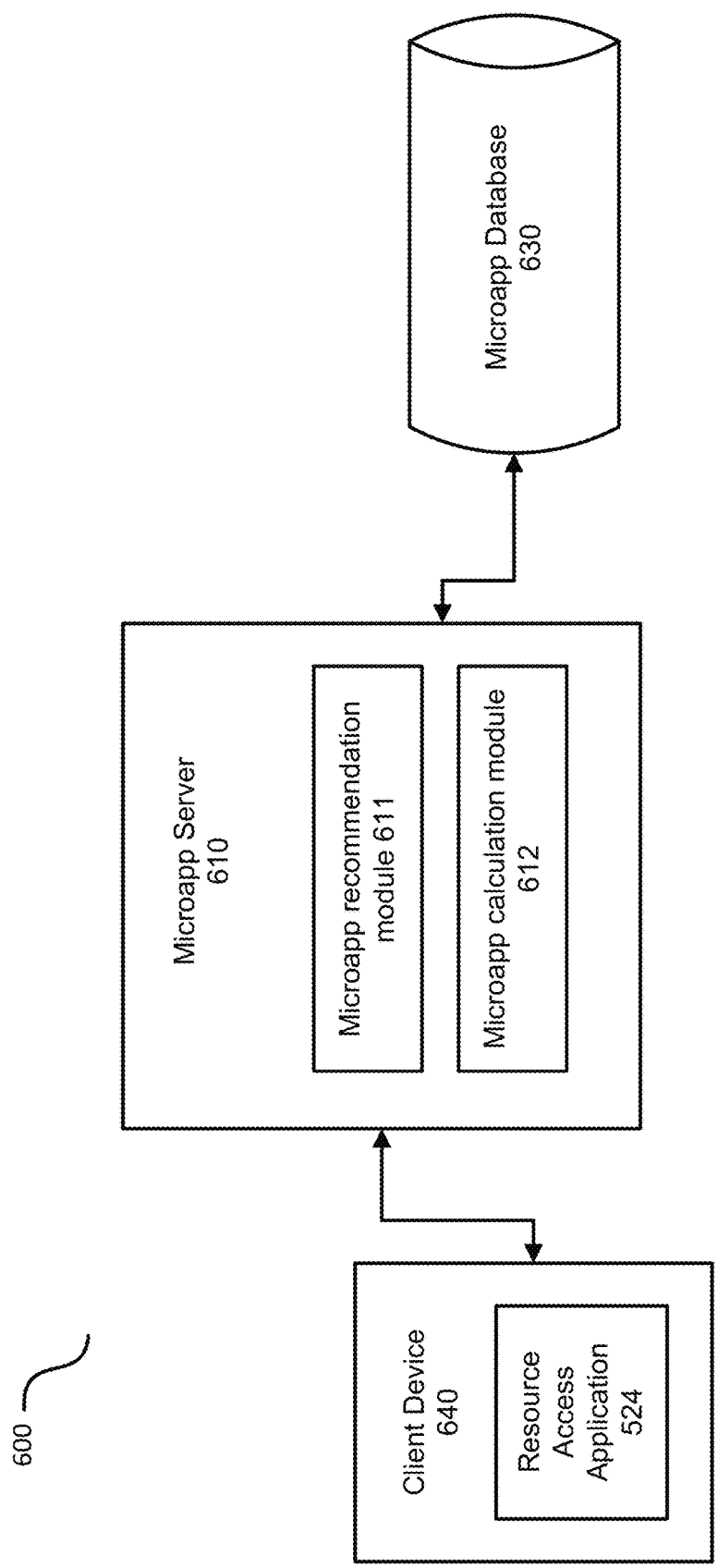
FIG. 6 depicts an example system for generating microapp recommendations that may be used in accordance with one or more illustrative aspects described herein.

FIG. 6 depicts an illustrative system 600 for generating microapp recommendations. The system 600 may include a microapp server 610, a microapp database 630, and/or a client device 640. A microapp may include an application, a widget, or any other software that is configured to execute on a computing device. A user may use the client device 640 (e.g., via the resource access application 524) to subscribe (e.g., install, access, or otherwise use) to one or more microapps. There may be many different microapps (e.g., hundreds, thousands, etc.) and the user may have difficulty determining which microapps to subscribe to. For example, it may be difficult for a user to read descriptions for each microapp and determine which ones may be helpful for the user (e.g., the user may not have enough time to search through the many microapps). Microapp recommendations may be sent to the client device 640 to improve user experience with microapps. The microapp recommendations may indicate microapps that the user is likely to need or use (e.g., the recommendations may indicate microapps that would be more helpful to the user than other microapps). The microapp server 610 may assist the user by sending recommendations for microapps to the client device 640 and the user may use the recommendations to determine microapps to subscribe to. The recommendations may be determined based on a microapp that the user has previously or is currently subscribed to.

The client device 640 may comprise, for example, any device of the client devices 240, the computing device 201, the device 103, and/or any component described in connection with FIGS. 1-5. The client device 640 may include a resource access application 524 (e.g., the resource access application 524 discussed above in connection with FIGS. 5A-5B). The client device 640 may be configured to communicate with the microapp server 610 to determine one or more microapps to recommend to a user.

The microapp server 610 may include a microapp recommendation module 611 and/or a microapp calculation module 612. A module may be software (e.g., machine-readable instructions) that configure a device (e.g., the microapp server 610) to perform one or more functions. The microapp server 610 may comprise the microapp service 530 discussed in connection with FIG. 5C. The microapp recommendation module 611 may be configured to send recommendations to the client device 640. The microapp recommendation module 611 may receive information from the client device 640 indicating which microapps a user is subscribed to. The recommendation module 611 may search for recommendations that have been generated by the microapp calculation module 612 and may send them to the user device 640. For example, the recommendation module 611 may send a query to the microapp database 630. The query may indicate a microapp to which the user has subscribed. In response, the microapp database 630 may return a list of corresponding recommended microapps to the recommendation module 611. The recommendation module 611 may send information to the microapp calculation module 612 indicating which users are subscribed to which microapps. For example, when a user subscribes to a new microapp, the recommendation module 611 may notify the calculation module 612 of the new subscription. The recommendation module 611 may also determine recommendations corresponding to the newly subscribed microapp and may send the recommendations to the client device 640. The recommendation module 611 may determine recommendations as described below in connection with FIGS. 9-11.

The microapp calculation module 612 may determine recommendations for microapps. The calculation module 612 may receive as input an indication of a microapp (e.g., the name or other identifier of a microapp) and may generate recommendations based on the input. The calculation module 612 may generate a list of recommendations for the input microapp based on one or more correlation levels. A correlation level may indicate a quantity of users that subscribe to or otherwise use both the input microapp and a second microapp. If a microapp is highly correlated with the input microapp, it may be recommended to a user of the input microapp. For example, the calculation module 612 may determine if a correlation level between a first microapp and a second microapp exceeds a threshold. If the correlation level satisfies the threshold, the second microapp may be recommended to a user of the first microapp. The calculation module 612 may repeat this process for each microapp stored in the database 630. For example, the calculation module 612 may determine a correlation level between the first microapp and other microapps in the database 630. For correlation levels that satisfy the threshold, the corresponding microapp may be added to a list of recommended microapps for the first microapp.

Figure 7A:
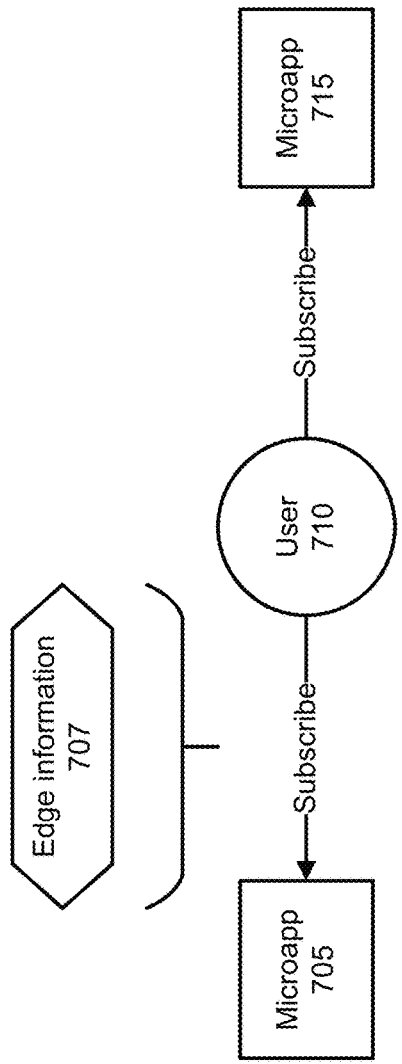
FIGS. 7A-7B depict example microapp graph structures that may be used in accordance with one or more illustrative aspects described herein.

The calculation module 612 may use data stored in the microapp database 630 to determine a correlation level between two microapps (e.g., as discussed in more detail in connection with FIGS. 9-10 below). The database 630 may store one or more graph structures such as those shown in FIGS. 7A-7B. For example, a graph structure may comprise a plurality of user nodes and a plurality of microapp nodes. As shown in FIG. 7A, a node representing a user 710 may be connected to one or more nodes representing microapps (e.g., microapp 705 and microapp 715). A connection or edge between the user node 710 and the microapp node 705 may indicate that a user corresponding to the user node 710 is and/or was subscribed to a microapp corresponding to the microapp node 705. A connection or edge may indicate that there is a relationship between a user node and a microapp node. For example, an edge between a user node and a microapp node may indicate that the user corresponding to the user node is subscribed to the microapp corresponding to the microapp node. The database 630 may store edge information for connections or edges. For example, the edge information 707 may correspond to the edge between the user 710 and the microapp 705. The edge information 707 may indicate when the connection between the user node 710 and the microapp 705 was formed. If the user corresponding to user node 710 is no longer subscribed to microapp 705, the edge information 707 may indicate when the user stopped subscribing to the microapp 705. For example, the edge information 707 may indicate a day, month, year, hour, and/or minute, corresponding to when the connection was formed. Additionally or alternatively, the edge information 707 may indicate the most recent time at which the user corresponding to the user node 710 was subscribed to the microapp 705. The database 630 may store application information for microapps. For example, the application information may include a description that explains the purpose of the microapp, functionality of the microapp, or other details about the microapp. The database 630 may store user information, such as gender, age, occupation, or other information about the user, to name just a few examples. The user information may indicate a department, team, or other organization of the user. The user information may indicate microapp(s) to which the user is subscribed.

Figure 7B:
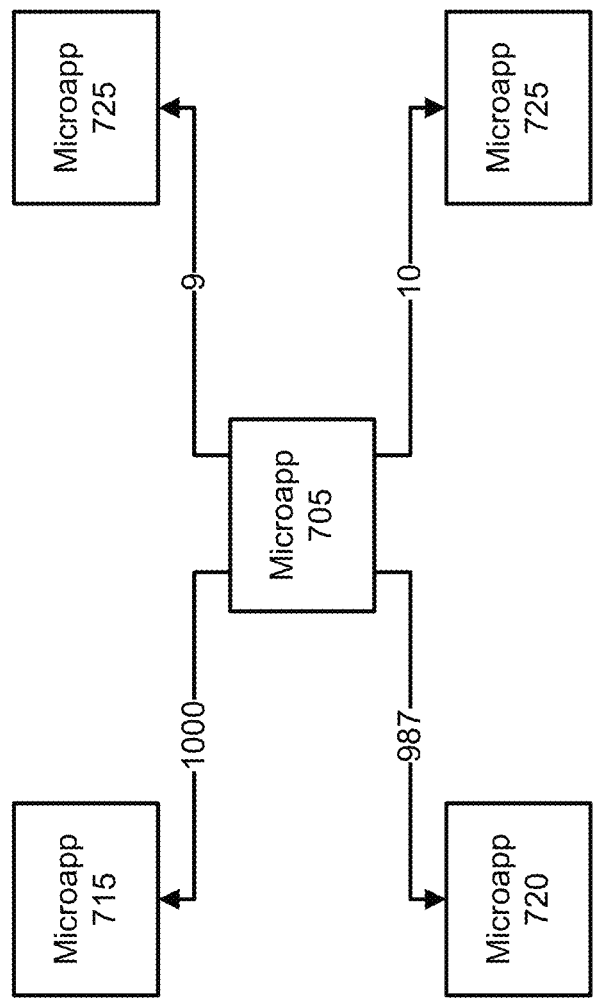

FIG. 7B shows an additional example of a graph structure 700B. The graph structure 700B may include a plurality of nodes that represent a microapp. The connection between two microapps in the graph structure 700B may indicate a number of users that are subscribed to both of the microapps. For example, there may be 1000 users that were subscribed and/or are currently subscribed to both microapp 715 and microapp 705. There may be 9 users that are subscribed to both microapp 725 and microapp 705. The microapp server 610 may determine that microapp 705 and microapp 715 have a higher correlation level than microapp 705 and microapp 725 because there are more users that use both microapp 705 and microapp 715.

Figure 8:
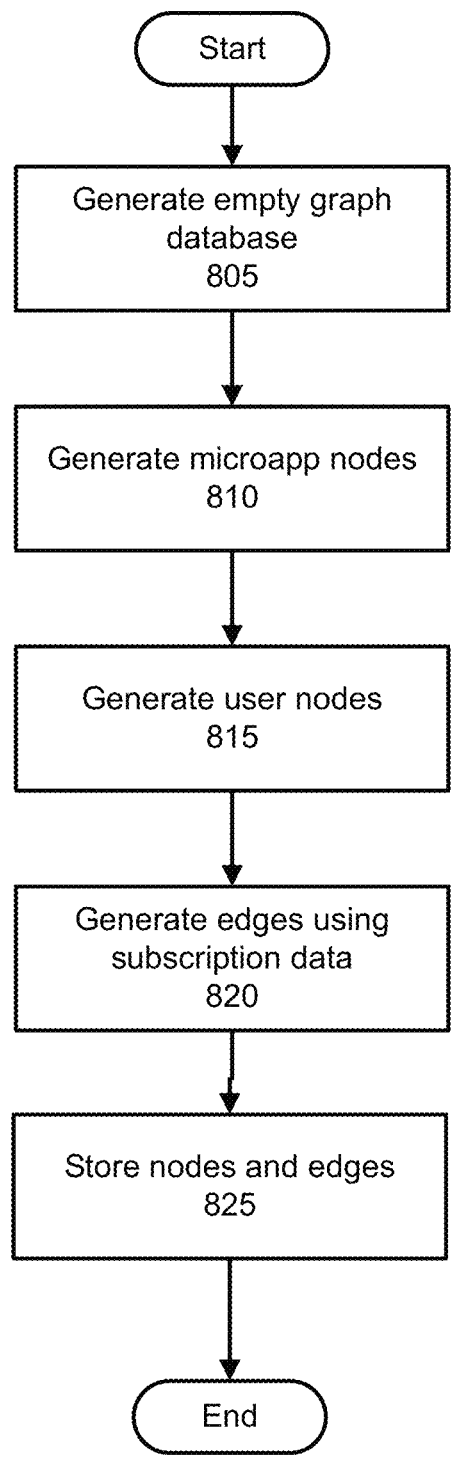
FIG. 8 depicts an example method for generating a microapp database that may be used in accordance with one or more illustrative aspects described herein.

FIG. 8 shows an example method for generating a database such as the database 630. Although one or more steps of the example method of FIG. 8 are described for convenience as being performed by the microapp server 610, one, some, or all of such steps may be performed by one or more other devices/modules, and/or steps may be distributed among one or more devices/modules, including any devices/modules such as those described in connection with FIGS. 1-7. One or more steps of the example method of FIG. 8 may be rearranged, modified, repeated, and/or omitted.

At step 805, the microapp server 610 may generate an empty database 630. At step 810, the microapp server 610 may generate microapp nodes. For example, the microapp server 610 may generate a microapp node for each microapp that is available for users to use. The microapp nodes may include application information such as the application information described above in connection with FIGS. 7A-7B. At step 815, the microapp server 610 may generate user nodes. For example, the microapp server 610 may generate a user node for each user in a system (e.g., the system 500, the system 600, etc.). The user nodes may include any information about the user discussed above in connection with FIGS. 7A-7B. At step 820, the microapp server 610 may generate edges using subscription data. The edges may be represented by data stored in memory on the microapp server 610. The microapp server 610 may determine which microapps a user is subscribed to. The microapp server 610 may generate an edge connecting user to the user's subscribed microapps. For example, an edge may be represented in a data structure such as a map that stores the user node as a key and each of the user's subscribed microapps as the values. At step 825, the nodes and edges generated in steps 810-820 may be stored in the database 630.

Figure 9:
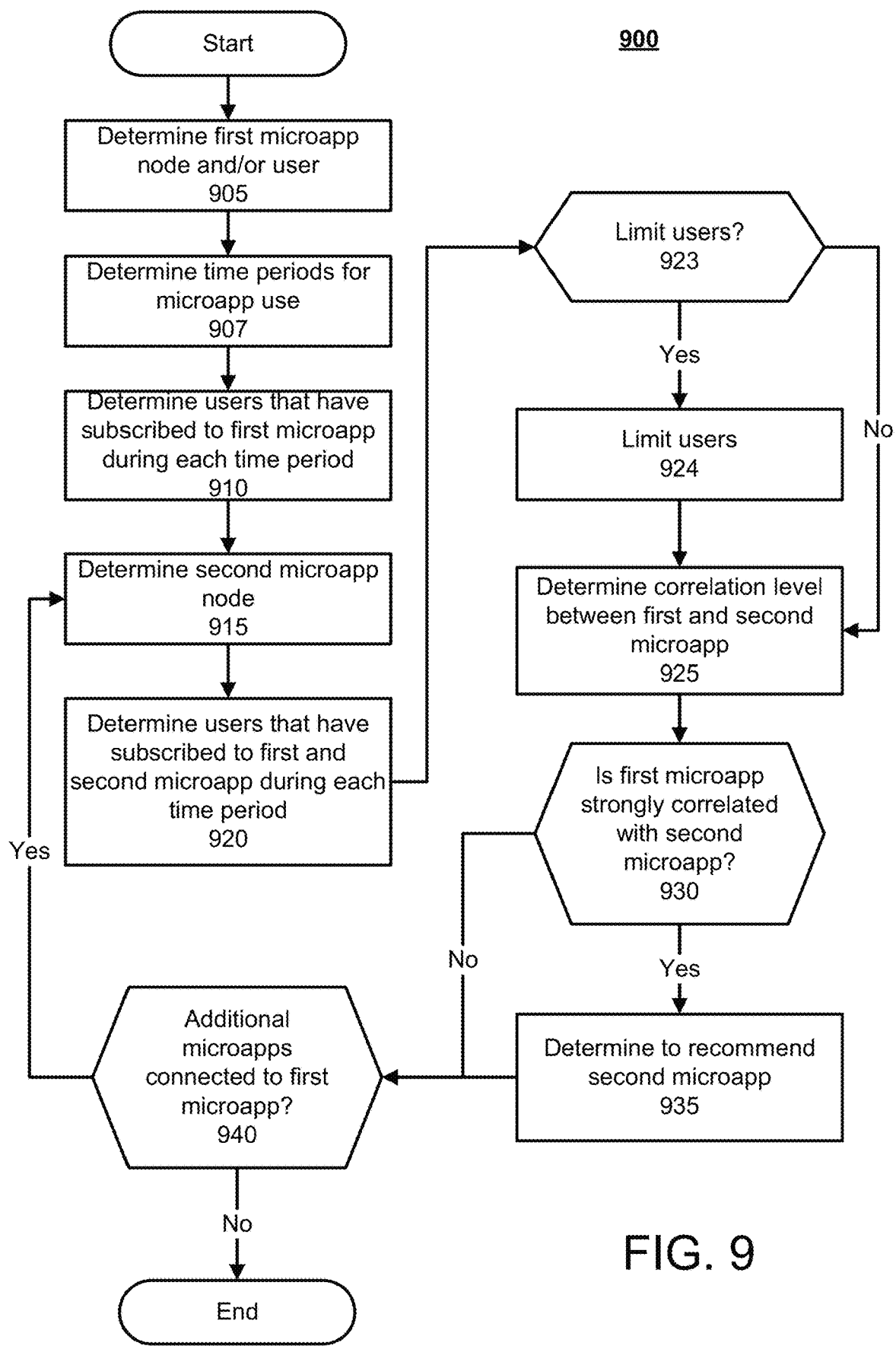
FIG. 9 depicts an example method for generating microapp recommendations that may be used in accordance with one or more illustrative aspects described herein.
Figure 10:
FIG. 10 depicts example time period coefficients that may be used in accordance with one or more illustrative aspects described herein.

FIG. 9 shows an example method 900 for generating microapp recommendations. Although one or more steps of the example method of FIG. 9 are described for convenience as being performed by microapp server 610 (e.g., the microapp calculation module 612), one, some, or all of such steps may be performed by one or more other devices/modules, and/or steps may be distributed among one or more devices/modules, including any devices/modules such as those described in connection with FIGS. 1-8. One or more steps of the example method of FIG. 9 may be rearranged, modified, repeated, and/or omitted.

At step 905, the microapp server 610 may determine a first microapp node for which to generate recommendations. For example, the microapp server 610 may receive information indicating that a user has newly subscribed to a microapp and the microapp server 610 may determine to generate recommendations for the newly subscribed to microapp so that the user may know of additional microapps that may be helpful. The recommendations may indicate additional microapps that a user of the first microapp would be interested in using or otherwise accessing. For example, the recommendations may include links, names, and/or descriptions for the additional microapps that the user may interested in using or accessing. The recommendations may include instructions for installing or using the recommended microapps. The microapp server 610 may also determine a user to generate recommendations for. For example, after a user subscribes to a first microapp, the microapp server 610 may determine that one or more recommendations for additional microapps should be generated and/or sent to the user.

At step 907, the microapp server 610 may determine time periods for microapp use. The time periods may be determined based on rules set by a user or administrator of the system 600. A time period may be any length of time (e.g., one year, one month, three months, one week, etc.). There may be any number of time periods (e.g., 2, 4, 5, 10, etc.). The time periods may be used to determine how recently a microapp was used by one or more users and may assist in determining recommendations for microapps. For example, by compartmentalizing microapp use into time periods, the microapp server 610 may be able to weight recently used, downloaded, or otherwise accessed microapp use more heavily than other microapp less frequently or otherwise not recently used when determining recommendations. By giving more weight to more recent microapp use, recommendations may be more relevant to current users. For example, more recent use may be more indicative of the current functionality or benefits of a microapp. Weighting more recent use higher than past use may allow the recommendations to be more helpful to a user of the microapps because they better reflect the current state of the microapps. The time periods may be used in determining a correlation level as discussed in connection with step 925 below. For example, as shown in FIG. 10, there may be four time periods 810. Each time period may be relative to the time at which recommendations are being determined. For example, a first time period may include the previous three months (e.g., a quarter of a year). A second time period may include time between six months ago and three months ago. A third time period may include time between one year ago and six months ago. A fourth time period may include any time that is more than one year ago.

At step 910, the microapp server 610 may determine users that have subscribed to the first microapp. The microapp server 610 may use the database 630 to determine the users. For example, the microapp server 610 may determine the number of user nodes that have a connection to the first microapp node (e.g., users that have used or subscribed to the first microapp). The microapp server 610 may determine the number of users of the first microapp for individual time periods determined in step 907. For example, if there are four time periods as shown in FIG. 10, the microapp server 610 may determine the users and/or the quantity of users of the first microapp within the four time periods (e.g., a quantity of users that used the first microapp within the most recent three months, a quantity of users that used the first microapp within six months and three months ago, a quantity of users that used the first microapp within one year and six months ago, and/or a quantity of users that used the first microapp more than one year ago). The users determined in step 910 and/or the users determined in step 920 (discussed below) may be any users associated with the system.

At step 915, the microapp server 610 may determine a second microapp node corresponding to a second microapp. The second microapp may be a microapp that is also used by one or more users of the first microapp. The microapp server 610 may generate a list of microapps that are also used by one or more users of the first microapp and may select the second microapp from the list (in some examples, steps 915-940 may be repeated for each microapp on the list). The microapp server 610 may use the second microapp node to determine whether the second microapp should be recommended to a user of the first microapp. For example, information stored in the second microapp node that corresponds to the second microapp may be used to determine whether the second microapp should be recommended (e.g., as discussed in more detail in connection with steps 925-935 below). The second microapp may be selected from a list of microapps that are connected, according to data stored in the microapp database 630, to the first microapp via a user (e.g., there is a user that is subscribed to both the first microapp and the second microapp). For example, the microapp server 610 may select the next microapp in the list to be the second microapp. Steps 915-940 may be repeated for other microapps in the list of microapps that are connected to the first microapp.

At step 920, the microapp server 610 may determine users that have subscribed to both the first microapp and the second microapp. The microapp server 610 may use the database 630 to determine which of the users determined in step 910 (e.g., the users that are subscribed to the first microapp) are also subscribed to the second microapp. The microapp server 610 may determine the number of users that used both the first microapp and the second microapp during time periods determined in step 907. For example, if there are four time periods as shown in FIG. 10, the microapp server 610 may determine the users and/or the quantity of users that used both the first microapp and the second microapp within individual time periods (e.g., a quantity of users that used both microapps within the last three months, a quantity of users that used both microapps within six months and three months ago, a quantity of users that used both microapps within one year and six months ago, and/or a quantity of users that used both microapps more than one year ago). For example, the microapp server 610 may send a query to the microapp database 630, the systems of record 528, or other database to determine the users and/or the quantity of users that used both the first microapp and the second microapp within individual time periods.

At step 923, the microapp server 610 may determine whether the users determined in steps 910 and/or 920 should be limited from consideration in generating recommendations. Information associated with the user (e.g., user preferences) determined in step 905 may indicate that recommendations generated by the user should be based on a limited number of other users. For example, the user preferences may indicate a user's desire to have recommendations for microapps be based on what microapps other users within the same department, team, or other organization are using. Additionally or alternatively, the user preferences may indicate a user's desire to have recommendations for microapps be based on users selected by the user. For example, the user may identify a list of users including one or more mentors, role models, or other users and may desire that microapp recommendations be based on microapps that the users on the list are using. Step 924 may be performed, for example, if the information associated with the user indicates that users (e.g., a quantity of users) should be limited. Step 925 may be performed, for example, if it is determined that the users should not be limited.

At step 924, the users determined in step 910 and/or step 920 may be limited. For example, instead of using the full quantity of users determined in step 910 and/or step 920, a limited quantity of users may be used (e.g., the data used to make recommendations may be limited to smaller quantity of users). The users determined in step 910 and/or step 920 may be limited to users within the same department, team, organization, or other group as the user. For example, if there were 400 users identified in step 910, but the user's preferences indicates that the users be limited to only the users that are within the same department as the user, then the microapp server 610 may limit the 400 users to those that are within the same department as the user. For example, if there are only 30 users out of the 400 that are within the same department as the user, then those 30 users may be used to determine whether the second microapp should be recommended (e.g., as discussed below in steps 925-935). By limiting the users to a particular group, the recommendations may more accurately reflect microapps used by users within the group. A user may be more interested in the microapps used within the group because the users in the group may have more similar needs, tasks, or goals as the user. Alternatively, the users determined in step 910 and/or step 920 may be limited to a particular set of users selected by the user for which microapp recommendations are generated. For example, the microapp server 610 may access user preferences to determine which users should be included in the determinations made in steps 910 and 920. For example, the user preferences may indicate particular users, such as mentors, role models, or other users on whom the recommendations should be based.

At step 925, the microapp server 610 may determine a correlation level between the first microapp and the second microapp. The correlation level may be based on the number of users of the first microapp and the second microapp during a time period determined in step 907. As shown in FIG. 10, time periods may have a corresponding weight coefficient 1020. The weight coefficient may weight more recent use of the first and/or second microapp more heavily than older use of the microapps. For example, the weight coefficient corresponding to the number of users that subscribed to the first and/or second microapp within the last three months may be 1. The weight coefficient corresponding to the number of users that subscribed to the first and/or second microapp between three months and six months ago may be 0.7. The weight coefficient corresponding to the number of users that subscribed to the first and/or second microapp between six months and one year ago may be 0.3. The weight coefficient corresponding to the number of users that subscribed to the first and/or second microapp more than a year ago may be zero. Recommendations may be more heavily influenced by recent use of microapps than older use of microapps. By giving more weight to more recent microapp use, recommendations may be more relevant to current users. The correlation level may be calculated using the following equation:

$$\text{Correlation level} = \frac{\sum_{i=1}^{n} T_i(XY) * C_i}{\sum_{i=1}^{n} T_i(X) * C_i}$$

where $T_i(X)$ is the number of users of the first microapp at time period i, $T_i(XY)$ is the number of users that use both the first microapp and second microapp during time period i, and $C_i$ is the weight coefficient for the corresponding time period i. The value n may correspond to the number of time periods (e.g., n may be 4 if the time periods shown in FIG. 10 are used).

At step 930, the microapp server 610 may determine whether the first microapp is strongly correlated with the second microapp. The first microapp may be strongly correlated with the second microapp, for example, if the correlation value determined in step 925 satisfies (e.g., exceeds) a threshold. The microapp server 610 may compare the correlation level determined in step 925 with a threshold value. The microapp server 610 may determine that the first microapp is strongly correlated with the second microapp, for example, if the correlation level satisfies the threshold (e.g., exceeds the threshold value). The threshold value may be adjusted based on whether users were restricted in step 924. For example, the threshold value may be lowered if the quantity of users were restricted in step 924. Step 935 may be performed, for example, if the first microapp is strongly correlated with the second microapp. If it is determined that the first microapp and second microapp are not strongly correlated, the microapp server 610 may determine not to recommend the second microapp to a user of the first microapp and step 940 may be performed.

At step 935, the microapp server 610 may determine to recommend the second microapp (e.g., because the second microapp is strongly correlated with the first microapp). The microapp server 610 may add the second microapp to a list of recommendations of microapps. The list of recommendations may include a plurality of microapps that are to be recommended to users of the first microapp. The list may be ordered by correlation level. For example, the list may include the microapp with the highest correlation level in the first position in the list, the microapp with the second highest correlation level in the second position in the list, and so on.

At step 940, the microapp server 610 may determine whether there are additional microapps connected to the first microcap in the microapp database 630. For example, the microapp server 610 may send a query to the microapp database 630 to retrieve information indicating what microapps are connected to the first microapp. For example, the microapp server 610 may determine if there are additional microapps on the list of microapps determined in step 915. If there are additional microapps, steps 915-935 may be repeated for additional microapps to determine whether an additional microapp should be added to the list of recommended microapps (e.g., the list of recommended microapps discussed in connection with step 935). If the microapp server 610 determines that there are no additional microapps, the method may end.

Figure 11:
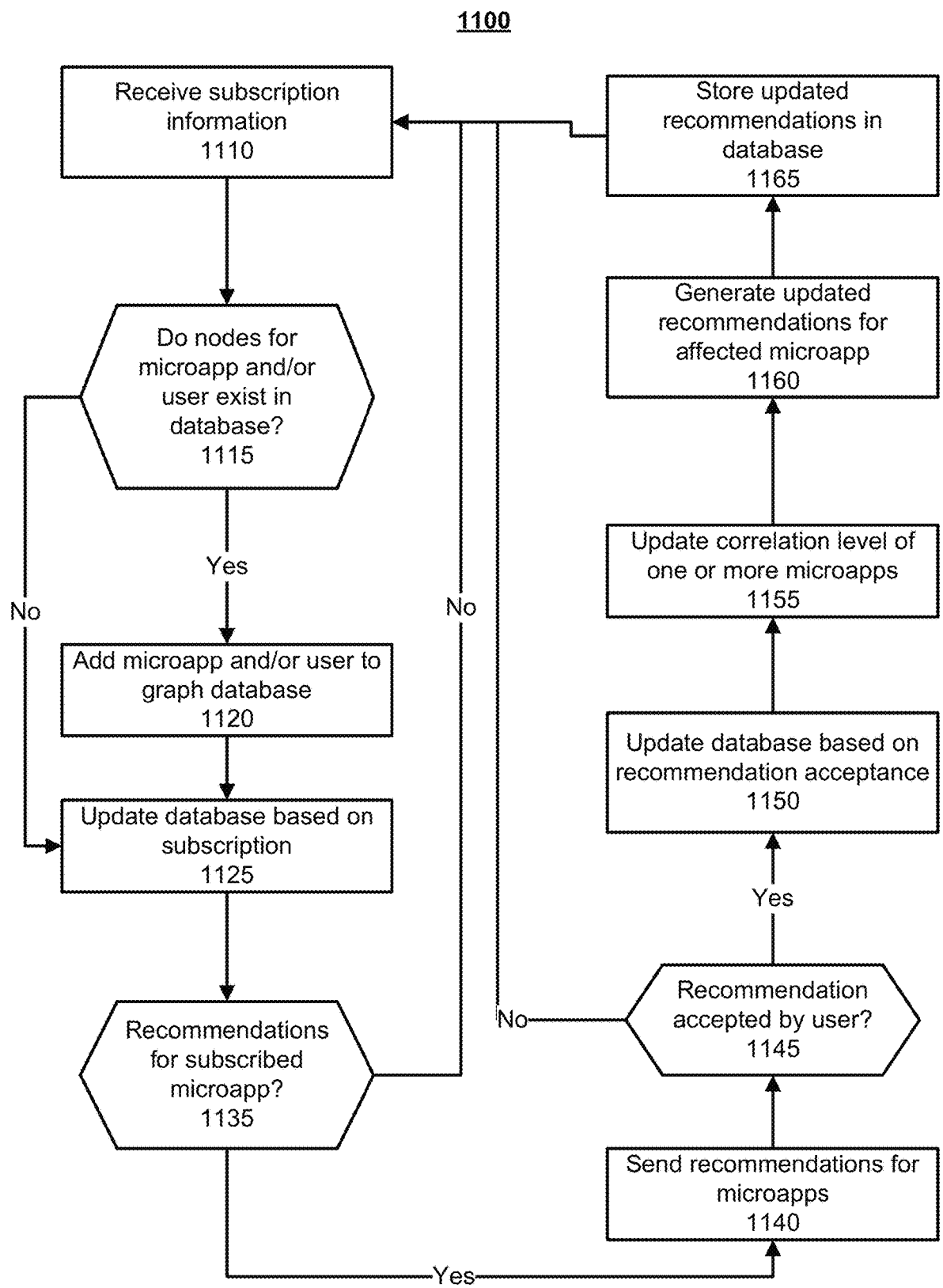
FIG. 11 depicts an example method for recommending microapps that may be used in accordance with one or more illustrative aspects described herein.

FIG. 11 shows an example method 1100 for recommending microapps. Although one or more steps of the example method of FIG. 11 are described for convenience as being performed by the microapp server 610, the client device 640, and/or the microapp database 630, one, some, or all of such steps may be performed by one or more other devices/modules, and/or steps may be distributed among one or more devices/modules, including any devices/modules such as those described in connection with FIGS. 1-8. One or more steps of the example method of FIG. 11 may be rearranged, modified, repeated, and/or omitted.

At step 1110, the microapp server 610 may receive subscription information indicating that a user subscribed to a microapp. The subscription information may indicate that a user has subscribed to, installed, downloaded, or otherwise used (e.g., via the client device 640) a microapp. The subscription information may indicate the time the subscription was made, the user and any user information associated with the subscription, and/or the microapp that was subscribed to.

At step 1115, the microapp server 610 may determine whether nodes for the microapp and/or user discussed in steps 1105 exist in the microapp database 630. If nodes for the microapp and/or user do not exist in the microapp database 630, step 1120 may be performed. If nodes for the microapp and/or user exist in the microapp database 630, step 1125 may be performed.

At step 1120, the microapp server 610 may cause nodes for the microapp and/or user to be generated and added to the microapp database 630. At step 1125, the microapp server 610 may update the database 630 based on the subscription performed in step 1105. For example, the microapp server 610 may update a correlation level corresponding to the microapp subscribed to in step 1105 or perform any other step described in connection with FIG. 9.

At step 1135, the microapp server 610 may determine whether there are any recommendations for the microapp subscribed to in step 1105. For example, the microapp server 610 may determine whether recommendations (e.g., a list of recommendations) have been previously generated for the microapp. For example, as described in connection with FIG. 9 above, a list of recommended microapps may have been generated for the microapp subscribed to in step 1105. In some cases, there may be no recommendations for a microapp. For example, a microapp may be new and there may be very few users using the new microapp such that a correlation level for the new microapp does not exceed a threshold. If there are no recommendations for the microapp, step 1105 may be performed for an additional microapp and or user. If the microapp server 610 determines that recommendations exist for the microapp, step 1140 may be performed.

At step 1140, the microapp server 610 may send recommendations for microapps to the client device 640. The microapp server 610 may send a portion of the recommended microapps. For example, the microapp server 610 may send a quantity of N (e.g., 5, 10, 15, etc.) recommended microapps having the highest correlation level in a plurality of recommended microapps. If a list of recommended microapps is in order from microapps having the highest correlation level to microapps having the lowest correlation level, the microapp server 610 may send the first N microapps in the list.

At step 1145, the microapp server 610 may determine whether a recommendation was accepted by a user. For example, the microapp server 610 may receive information indicating that a user has subscribed to a recommended microapp that was sent in step 1140. If the microapp server 610 receives such an indication, step 1150 may be performed. If the microapp server 610 does not receive an indication that a user has accepted a recommendation, step 1105 may be performed for an additional microapp and or user.

At step 1150, the microapp server 610 may update the microapp database 630 based on the recommendation that was accepted in step 1145. If a user has accepted a recommendation (e.g., by subscribing to a recommended microapp), the microapp database 630 may need to be updated with one or more new edges reflecting the change in microapp subscription. The microapp server 610 may determine microapps that the user is subscribed to. The microapp server 610 may generate one or more new edges linking each of the microapps (or nodes corresponding to the microapps) the user is subscribed to (e.g., the affected microapps determined in step 1150), with the microapp corresponding to the microapp recommendation that the user accepted. The microapp server 610 may generate one or more new edges that indicates a connection between each of the microapps that the user previously subscribed to and the recommended microapp that the user accepted in step 1145.

At step 1155, the microapp server 610 may update the correlation level of one or more microapps. The microapp server 610 may update correlation levels for microapps that were affected by the user accepting the recommended microapp in step 1145. For example, a user may initially be subscribed to microapps A and B. In step 1105, the user may have subscribed to an additional microapp, called microapp C. Based on subscribing to microapp C, the microapp server 610 may send one or more microapp recommendations to the user (e.g., in step 1140). The recommendations may include microapp D. The user may accept the recommendation and subscribe to microapp D. Based on subscribing to microapp D, the edges in the microapp database 630 that are associated with microapp D may be updated (e.g., any microapp that is connected to microapp D in the microapp database 630) to include additional edges between microapp D and each of the other microapps the user is subscribed to (e.g., one additional edge between microapps D and A, one additional edge between microapps D and B, and one additional edge between microapps D and C). Because the edges for each of microapps A, B, C, and D were updated, the correlation level for each of the microapps may need to be updated as well. The microapp server 610 may determine a correlation level (e.g., as described in connection with FIG. 9) between microapp D and each microapp in the microapp database 630 that is connected to microapp D (e.g., each microapp that has an edge connecting it with microapp D).

At step 1160 the microapp server 610 may generate recommendations for one or more microapps. For example, according to the example described above, the microapp server 610 may generate recommendations for microapp D. Additionally or alternatively, the microapp server 610 may generate recommendations for any microapp for which a correlation level was updated in step 1155. The microapp server 610 may perform the method described in connection with FIG. 9 to determine recommendations for one or more microapps. To generate the recommendations, the microapp server 610 may compare the correlation levels of each microapp with a threshold value. If the correlation level between a first microapp and a second microapp satisfies the threshold, then the microapp server 610 may add the second microapp to a list of microapps that are recommended for the first microapp. For example, using the example described above, if the correlation level between microapp D and microapp C satisfies the threshold, then microapp C may be added to a recommendation list for microapp D. At step 1165, the updated recommendations may be stored for later use. The method 1100 may return to step 1105 and may repeat as needed (e.g., as one or more users subscribe to additional microapps).

The following paragraphs (M1) through (M14) describe examples of methods that may be implemented in accordance with the present disclosure.

(M1) A method comprising: receiving, by a computing device, a request from a client device to use a first microapp; determining, by the computing device, a correlation between the first microapp and a second microapp based on a first number of users that use both the first microapp and a second microapp during a given time period; and providing access to the second microapp in response to the correlation exceeding a threshold.

(M2) A method may be performed as described in paragraph (M1) further comprising weighting, based on a determination that the time period is more recent than a second time period corresponding to a second number of users, the first number more than the second number.

(M3) A method may be performed as described in any of paragraphs (M1) through (M2) wherein the determining a correlation between the first microapp and the second microapp comprises: determining a number of users of the first microapp during the time period; and determining, based on the number of users of the first microapp and the number of users that use both the first microapp and the second microapp, the correlation.

(M4) A method may be performed as described in any of paragraphs (M1) through (M3) wherein the number of users is determined based on edge information indicating a time at which each user began using the first microapp.

(M5) A method may be performed as described in any of paragraphs (M1) through (M4) wherein the first number of users is determined based on information retrieved from a graph database, wherein the graph database comprises a user node corresponding to each user.

(M6) A method may be performed as described in any of paragraphs (M1) through (M5) wherein the first microapp and second microapp are determined based on information retrieved from a graph database, wherein the graph database stores a first microapp node corresponding to the first microapp.

(M7) A method may be performed as described in any of paragraphs (M1) through (M6) wherein the first number of users is determined based on information retrieved from a graph database, wherein the graph database comprises a user node indicating a user and an edge connecting the user node to a microapp node, wherein the edge indicates that the user has subscribed to a microapp corresponding to the microapp node.

(M8) A method comprising receiving, based on a request from a user device, an indication that the user device has used a first microapp; storing, in a graph database, an edge connecting a user node corresponding to the user device and a microapp node corresponding to the first microapp; determining, based on a first correlation set and a second correlation set corresponding to the graph database, a correlation between the first microapp and a second microapp; and based on the correlation exceeding a threshold, sending, to the user device, a recommendation to use the second microapp.

(M9) A method may be performed as described in paragraph (M8) further comprising weighting, based on a determination that a time period corresponding to a first number in the first correlation set is more recent than a time period corresponding to a second number in the first correlation set, the first number more than the second number.

(M10) A method may be performed as described in any of paragraphs (M8) through (M9) wherein the first correlation set indicates a number of users of the first microapp, the method further comprising: determining, based on user preferences indicating a limit to the number of users of the first microapp, a reduced number of users of the first microapp.

(M11) A method may be performed as described in any of paragraphs (M8) through (M10) wherein a number of users of both the first microapp and the second microapp correspond to users that are within a same working group as a user associated with the user device.

(M12) A method may be performed as described in any of paragraphs (M8) through (M11) wherein a number of users of both the first microapp and the second microapp correspond to users selected by a user associated with the user device.

(M13) A method may be performed as described in any of paragraphs (M8) through (M12) wherein a number of users of both the first microapp and the second microapp correspond to users with a same job title as a user associated with the user device.

(M14) A method may be performed as described in any of paragraphs (M8) through (M13) further comprising: determining, for a user associated with the user device, a number of team members that have used the second microapp; and adjusting, based on the number of team members, an order of the second microapp within a list of recommendations comprising the second microapp.

The following paragraphs (C1) through (C7) describe examples of computing devices that may be implemented in accordance with the present disclosure.

(C1) A computing device comprising: at least one processor; and memory storing computer-readable instructions that, when executed by the at least one processor, cause the computing device to: receive, by a computing device, a request from a client device to use a first microapp; determine, by the computing device, a correlation between the first microapp and a second microapp based on a first number of users that use both the first microapp and a second microapp during a given time period; and providing access to the second microapp in response to the correlation exceeding a threshold.

(C2) A computing device as described in paragraph (C1), wherein the memory, when executed by the at least one processor, further cause the computing device to: weight, based on a determination that the time period is more recent than a second time period corresponding to a second number of users, the first number more than the second number.

(C3) A computing device as described in any of paragraphs (C1) through (C2) wherein the determining a correlation between the first microapp and the second microapp comprises: determining a number of users of the first microapp during the time period; and determining, based on the number of users of the first microapp and the number of users that use both the first microapp and the second microapp, the correlation.

(C4) A computing device as described in any of paragraphs (C1) through (C3) The computing device of claim 15, wherein the number of users is determined based on information retrieved from a graph database, wherein the graph database comprises a user node corresponding to each user.

(C5) A computing device as described in any of paragraphs (C1) through (C4) wherein the first microapp and second microapp are determined based on information retrieved from a graph database, wherein the graph database stores a first microapp node corresponding to the first microapp.

(C6) A computing device as described in any of paragraphs (C1) through (C5) wherein the number of users is determined based on information retrieved from a graph database, wherein the graph database comprises a user node indicating a user and an edge connecting the user node to a microapp node, wherein the edge indicates that the user has subscribed to a microapp corresponding to the microapp node.

(C7) A computing device as described in any of paragraphs (C1) through (C6)

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device, a request from a client device to use a first microapp;
   determining, by the computing device, a correlation between the first microapp and a second microapp based on a first number of users that use both the first microapp and a second microapp during a given time period, wherein the time period indicates a usage recency of the first microapp and the second microapp; and
   providing access to the second microapp in response to the correlation exceeding a threshold;
   wherein the correlation is based on a ratio of users of the first and second microapp over the given time period, to a sum of users of the first microapp over the given time period, and multiplied by a weighting factor that weighs the correlation in favor of more recent usage of the second microapp within the given time period.

2. The method of claim 1, wherein the determining a correlation between
   the first microapp and the second microapp comprises:
   determining a number of users of the first microapp during the given time period; and
   determining the correlation based on the number of users of the first microapp and the number of users that use both the first microapp and the second microapp.

3. The method of claim 1, wherein the first number of users is determined based on information retrieved from a graph database, wherein the graph database comprises a user node corresponding to each user.

4. The method of claim 1, wherein the first microapp and second microapp are determined based on information retrieved from a graph database, wherein the graph database stores a first microapp node corresponding to the first microapp.

5. The method of claim 1, wherein the first number of users is determined based on information retrieved from a graph database, wherein the graph database comprises a user node indicating a user and an edge connecting the user node to a microapp node, and wherein the edge indicates that the user has subscribed to a microapp corresponding to the microapp node.

6. The method of claim 1, further comprising:
   recommending a list of a plurality of microapps, wherein the plurality of microapps are ordered based on the correlation between the first microapp and each of the plurality of microapps.

7. The method of claim 1 wherein:
   determining the correlation comprises:
   generating a graph comprising:
   a plurality of first nodes representing users;
   at least one second node representing the first microapp;
   at least one third node representing the second microapp; and
   a plurality of first edges between the first nodes and the second node representing a relationship between the users and the first microapp;
a plurality of second edges between the first nodes and the third node representing
a relationship between the users and the second microapp; and
using the graph to generate a correlation edge between the second node and the third node containing information about the correlation between the first microapp and the second microapp.

8. The method of 7 wherein at least one edge of the plurality of first edges and the plurality of second edges contains information about:
a subscription between a user represented by one of the first nodes and a microapp;
a date and time at which a subscription between the user and the first microapp and/or the second microapp was formed;
a date and time at which a subscription between the user and the first microapp and/or the second microapp was ended;
a most recent time that a user represented by one of the first nodes was subscribed to the first microapp and/or the second microapp; or
a combination thereof.

9. A method comprising:
receiving, based on a request from a user device, an indication that the user device has used a first microapp;
storing, in a graph database, an edge connecting a user node corresponding to the user device and a microapp node corresponding to the first microapp;
determining, based on a first correlation set and a second correlation set corresponding to the graph database, a correlation between the first microapp and a second microapp during a given time period, wherein the time period indicates a usage recency of the first microapp and the second microapp; and
based on the correlation exceeding a threshold, sending, to the user device, a recommendation to use the second microapp;
wherein the first correlation set and the second correlation set are based on a ratio of a sum of users of both the first and second microapp over the given time period, to a sum of users of the first microapp over the given time period, and multiplied by a weighting factor that weighs the correlation in favor of more recent usage of the second microapp within the given time period.

10. The method of claim 9, further comprising weighting, based on a determination that a time period corresponding to a first number in the first correlation set is more recent than a time period corresponding to a second number in the first correlation set, the first number more than the second number.

11. The method of claim 9, wherein the first correlation set indicates a number of users of the first microapp, the method further comprising:
determining, based on user preferences indicating a limit to the number of users of the first microapp, a reduced number of users of the first microapp.

12. The method of claim 9, wherein a number of users of both the first microapp and the second microapp correspond to users that are within a same working group as a user associated with the user device.

13. The method of claim 9, wherein a number of users of both the first microapp and the second microapp correspond to users selected by a user associated with the user device.

14. The method of claim 9, wherein a number of users of both the first microapp and the second microapp correspond to users with a same job title as a user associated with the user device.

15. The method of claim 9, further comprising:
determining, for a user associated with the user device, a number of team members that have used the second microapp; and
adjusting, based on the number of team members, an order of the second microapp within a list of recommendations comprising the second microapp.

16. A computing device comprising:
at least one processor; and memory storing computer-readable instructions that, when executed by the at least one processor, cause the computing device to:
receive, by a computing device, a request from a client device to use a first microapp;
determine, by the computing device, a correlation between the first microapp and a second microapp based on a first number of users that use both the first microapp and a second microapp during a given time period, wherein the time period indicates a usage recency of the first microapp and the second microapp; and
providing access to the second microapp in response to the correlation exceeding a threshold;
wherein the correlation is based on a ratio of a sum of users of both the first and second microapp over the given time period, to a sum of users of the first microapp over the given time period, and multiplied by a weighting factor that weighs the correlation in favor of more recent usage of the second microapp within the given time period.

17. The computing device of claim 16, wherein the memory, when executed by the at least one processor, further cause the computing device to:
weight, based on a determination that the time period is more recent than a second time period corresponding to a second number of users, the first number more than the second number.

18. The computing device of claim 16, wherein the determining a correlation between the first microapp and the second microapp comprises:
determining a number of users of the first microapp during the time period; and
determining, based on the number of users of the first microapp and the number of users that use both the first microapp and the second microapp, the correlation.

19. The computing device of claim 16, wherein the number of users is determined based on information retrieved from a graph database, wherein the graph database comprises a user node corresponding to each user.

20. The computing device of claim 16, wherein the first microapp and second microapp are determined based on information retrieved from a graph database, wherein the graph database stores a first microapp node corresponding to the first microapp.

21. The computing device of claim 16, wherein the number of users is determined based on information retrieved from a graph database, wherein the graph database comprises a user node indicating a user and an edge connecting the user node to a microapp node, and wherein the edge indicates that the user has subscribed to a microapp corresponding to the microapp node.

* * * * *